United States Patent
Wu et al.

(10) Patent No.: US 9,788,340 B2
(45) Date of Patent: Oct. 10, 2017

(54) METHOD, ACCESS POINT, AND STATION FOR ESTABLISHING ASSOCIATION IN WIRELESS LOCAL AREA NETWORK

(71) Applicant: Huawei Technologies Co., Ltd., Shenzhen, Guangdong (CN)

(72) Inventors: Tianyu Wu, Shenzhen (CN); Peter Loc, Cupertino, CA (US); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 14/617,113

(22) Filed: Feb. 9, 2015

(65) Prior Publication Data

US 2015/0156791 A1    Jun. 4, 2015

Related U.S. Application Data

(63) Continuation of application No. PCT/CN2013/082127, filed on Aug. 23, 2013.

(30) Foreign Application Priority Data

Aug. 24, 2012    (CN) .......................... 2012 1 0305293

(51) Int. Cl.
*H04W 72/12*    (2009.01)
*H04W 74/04*    (2009.01)
(Continued)

(52) U.S. Cl.
CPC ......... *H04W 72/121* (2013.01); *H04W 8/005* (2013.01); *H04W 68/02* (2013.01);
(Continued)

(58) Field of Classification Search
CPC ........................... H04W 72/121; H04W 74/04
See application file for complete search history.

(56) References Cited

U.S. PATENT DOCUMENTS

| 7,508,781 B2 | 3/2009 | Liu et al. |
|---|---|---|
| 2011/0149880 A1 | 6/2011 | Gong |

(Continued)

FOREIGN PATENT DOCUMENTS

| CN | 102186254 A | 9/2011 |
|---|---|---|
| CN | 102196565 A | 9/2011 |
| WO | WO 2007/080513 A2 | 7/2007 |

OTHER PUBLICATIONS

Kolap et al., Frame Aggregation Mechanism for High-Throughput 802.11n WLANs, International Journal of Wireless & Mobile Networks (IJWMN), vol. 4, No. 3, Jun. 2012, 13 pages.*

(Continued)

*Primary Examiner* — Hoon J Chung (57) ABSTRACT

Embodiments of the present invention provide a method, an access point, and a station for establishing an association in a WLAN. The method includes: sending an association message to a group of stations STAs including a plurality of STAs in the wireless local area network WLAN; sending a first notification to the group of STAs, where the first notification carries identifier information of each STA and information about a scheduling sequence for each STA; and receiving response messages sequentially sent, according to the scheduling sequence in the first notification, in response to the association message by the group of STAs. Thereby reducing the number of channel contentions, accelerating the process of associating the STAs with the AP, and ensuring that a STA used for a key application can establish an association with the AP quickly.

20 Claims, 6 Drawing Sheets

(51) Int. Cl.
*H04W 8/00* (2009.01)
*H04W 68/02* (2009.01)
*H04W 72/00* (2009.01)
*H04W 84/12* (2009.01)
*H04W 88/02* (2009.01)
*H04W 88/08* (2009.01)

(52) U.S. Cl.
CPC ......... *H04W 72/005* (2013.01); *H04W 74/04* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2011/0149882 A1* | 6/2011 | Gong | H04L 1/1685 370/329 |
| 2012/0063433 A1 | 3/2012 | Wentink | |
| 2012/0099568 A1 | 4/2012 | Wentink | |
| 2013/0242825 A1* | 9/2013 | Farhadi | H04W 72/121 370/311 |
| 2013/0301625 A1* | 11/2013 | Thoukydides | H04W 28/06 370/338 |

OTHER PUBLICATIONS

"Part 11: Wireless LAN Medium Access Control (MAC) and Physical Layer (PHY) Specifications—Amendment 6: Sub 1 GHz License Exempt Operation", IEEE P802.11ah/D0.1, May 2013, 327 pages.

Chao-Chun Wang, et al., Supporting Large Number of STAs in 802.11ah, MediaTek, Inc., May 9, 2011, 7 pages.

Haiguang Wang, et al., "Supporting Authentication/Association for Large Number of Stations", Jan. 2012, 17 pages.

* cited by examiner

METHOD, ACCESS POINT, AND STATION FOR ESTABLISHING ASSOCIATION IN WIRELESS LOCAL AREA NETWORK

CROSS-REFERENCE TO RELATED APPLICATION

This application is a continuation of International Application No. PCT/CN2013/082127, filed on Aug. 23, 2013, which claims priority to Chinese Patent Application No. 201210305293.5, filed on Aug. 24, 2012, both of which are hereby incorporated by reference in their entireties.

TECHNICAL FIELD

Embodiments of the present invention relate to the field of wireless communications, and in particular, to a method, an access point, and a station for establishing an association in a wireless local area network (Wireless Local Area Network, WLAN for short).

BACKGROUND

Among applications of a WLAN system, application scenarios such as a sensor, a smart grid, a smart meter, and a mobile data bypass are gaining increasingly widespread attention. In applications of this type, a large number of stations (Stations, STAs for short) may exist in a basic service set (Basic Service Set, BSS for short). In some application scenarios, a BSS may support as many as 6000 STAs. If a large number of STAs need to be associated with an access point (Access Point, AP for short) at the same time in the system, because an association process for each STA requires several channel contentions, a severe collision problem causes congestion in the system, and it may take a very long time to complete the association processes for all the STAs. For example, when the following cases occur, the AP may encounter the scenario where a large number of STAs need to be associated:

1) The loss of power on a transmission line causes a large number of smart grid devices, sensors, or smart meter devices to restart.

2) The reset of a power supply of the AP causes all devices to lose the association with the AP.

Because a large number of STAs such as a sensor and smart meter work at a relatively low rate, for example, 100 kbps, and lengths of frames of information exchanged in the association processes are relatively large, the possibility of collision further increases when a hidden node exists in the system. If a large number of STAs need to be associated at the same time in the BSS, it takes tens of minutes to several hours or even longer to complete simultaneous association processes for hundreds to thousands of STAs. When service types such as a health monitoring sensor and a fire alarm sensor which have relatively high requirements for a time delay exist in the system, the excessively long association time cannot satisfy the service demand.

SUMMARY

Embodiments of the present invention provide a method for establishing an association in a WLAN, which can reduce the number of channel contentions, effectively increase an association speed in an association process, and implement quick association.

In a first aspect, a method for establishing an association in a wireless local area network is provided. The method includes:

sending an association message to a group of stations STA including a plurality of STAs in the wireless local area network WLAN;

sending a first notification to the group of STAs, where the first notification carries identifier information of each STA and information about a scheduling sequence for each STA; and receiving response messages sequentially sent, according to the scheduling sequence in the first notification, in response to the association message by the group of STAs.

With reference to the first aspect, in a first possible implementation manner, the first notification carries frame length information Tf of the response messages; and according to the scheduling sequence, adjacent STAs send the response messages at an interval of a short interframe space SIFS.

With reference to the first aspect and/or the first possible implementation manner of the first aspect, in a second possible implementation manner, the method further includes: sending a second notification to the group of STAs after a delay of a preset duration, where the second notification is used to instruct the group of STAs to start to send the response messages; and the receiving response messages sequentially sent, according to the scheduling sequence in the first notification, in response to the association message by the group of STAs specifically includes:

if the STA is the $k^{th}$ in the scheduling sequence, receiving the response message that is sent by the STA at a time T0+SIFS+(Tf+SIFS) (k−1), where T0 is a time when the STA receives the second notification.

With reference to the first aspect and/or the first and second possible implementation manners of the first aspect, in a third possible implementation manner, the receiving response messages sequentially sent, according to the scheduling sequence in the first notification, in response to the association message by the group of STAs specifically includes:

receiving the response message sent, by contending for a channel, by the STA that is the first in the scheduling sequence;

sending a second notification to the group of STAs after the SIFS, where the second notification is used to instruct remaining STAs in the group of STAs to start to send the response messages; and receiving the response messages sequentially sent, according to the scheduling sequence in the first notification, in response to the association message by the remaining STAs in the group of STAs.

With reference to the first aspect and/or the first to third possible implementation manners of the first aspect, in a fourth possible implementation manner, the receiving response messages sequentially sent, according to the scheduling sequence in the first notification, in response to the association message by the group of STAs specifically includes:

if the STA is the $k^{th}$ in the scheduling sequence and k=1, receiving the response message sent, by contending for a channel, by the STA; and if the STA is the $k^{th}$ in the scheduling sequence and k>1, receiving the response message that is sent by the STA at a time Tm+SIFS+(Tf+SIFS)(k−m), where Tm is a time when an $m^{th}$ STA in the scheduling sequence completes sending of the response message, where 1=<m<k.

In a second aspect, a method for establishing an association in a wireless local area network is provided. The method includes:

receiving an association message sent by an access point AP;

receiving a first notification sent by the AP, where the first notification carries identifier information of a station STA and information about a scheduling sequence for the STA; and sending, according to the identifier information of the STA and the information about the scheduling sequence for the STA, a response message in response to the association message to the AP.

With reference to the second aspect, in a first possible implementation manner, the first notification carries frame length information Tf of the response message, and adjacent STAs in the scheduling sequence send the response messages at an interval of a short interframe space SIFS.

With reference to the second aspect and/or the first possible implementation manner of the second aspect, in a second possible implementation manner, the method further includes: receiving a second notification sent by the AP, where the second notification is used to instruct the STA to start to send the response message according to the scheduling sequence.

With reference to the second aspect and/or the first and second possible implementation manners of the second aspect, in a third possible implementation manner, if the STA is the $k^{th}$ in the scheduling sequence, the STA sends the response message to the AP at a time T0+SIFS+(Tf+SIFS)(k−1), where T0 is a time when the STA receives the second notification.

With reference to the first aspect and/or the first to third possible implementation manners of the first aspect, in a fourth possible implementation manner, the sending, according to the information about the scheduling sequence for the STA, a response message in response to the association message to the AP specifically includes:

if the STA is the $k^{th}$ in the scheduling sequence and k=1, sending, by the STA, by contending for a channel, the response message in response to the association message to the AP; and if the STA is the $k^{th}$ in the scheduling sequence and k>1, sending, by the STA, the response message to the AP at a time Tm+SIFS+(Tf+SIFS)(k−m), where Tm is a time when an $m^{th}$ STA in the scheduling sequence completes sending of the response message, where 1=<m<k.

In a third aspect, an access point is provided. The access point includes:

a sending unit, configured to send an association message to a group of stations STA including a plurality of STAs in a wireless local area network WLAN, where the sending unit is further configured to send a first notification to the group of STAs, where the first notification carries identifier information of each STA and information about a scheduling sequence for each STA; and a receiving unit, configured to receive response messages sequentially sent, according to the scheduling sequence in the first notification, in response to the association message by the group of STAs.

With reference to the third aspect, in a first possible implementation manner, the first notification carries frame length information Tf of the response messages, and adjacent STAs in the scheduling sequence send the response messages at an interval of a short interframe space SIFS.

With reference to the third aspect and/or the first possible implementation manner of the third aspect, in a second possible implementation manner, the sending unit is further configured to send a second notification to the group of STAs after a delay of a preset duration, where the second notification is used to instruct the group of STAs to start to send the response messages; and if the STA is the $k^{th}$ in the scheduling sequence, the receiving unit is configured to receive the response message that is sent by the STA at a time T0+SIFS+(Tf+SIFS)(k−1), where T0 is a time when the STA receives the second notification.

With reference to the third aspect and/or the first and second possible implementation manners of the third aspect, in a third possible implementation manner, the receiving unit is configured to receive the response message sent, by contending for a channel, by the STA that is the first in the scheduling sequence; the sending unit is configured to send a second notification to the group of STAs after the SIFS, where the second notification is used to instruct remaining STAs in the group of STAs to start to send the response messages; and the receiving unit is configured to receive the response messages sequentially sent, according to the scheduling sequence in the first notification, in response to the association message by the remaining STAs in the group of STAs.

With reference to the third aspect and/or the first to third possible implementation manners of the third aspect, in a fourth possible implementation manner, if the STA is the $k^{th}$ in the scheduling sequence and k=1, the receiving unit is configured to receive the response message sent, by contending for a channel, by the STA; and if the STA is the $k^{th}$ in the scheduling sequence and k>1, the receiving unit is configured to receive the response message that is sent by the STA at a time Tm+SIFS+(Tf+SIFS)(k−m), where Tm is a time when an $m^{th}$ STA in the scheduling sequence completes sending of the response message, where 1=<m<k.

In a fourth aspect, a station is provided. The station includes:

a receiving unit, configured to receive an association message sent by an access point AP, where the receiving unit is further configured to receive a first notification sent by the AP, where the first notification carries identifier information of the station and information about a scheduling sequence for the station; and a sending unit, configured to send, according to the identifier information of the station and the information about the scheduling sequence for the station, a response message in response to the association message to the AP.

With reference to the fourth aspect, in a first possible implementation manner, the first notification carries frame length information Tf of the response message, and adjacent stations in the scheduling sequence send the response messages at an interval of a short interframe space SIFS.

With reference to the fourth aspect and/or the first possible implementation manner of the fourth aspect, in a second possible implementation manner, the receiving unit is further configured to receive a second notification sent by the AP, where the second notification is used to instruct the station to start to send the response message according to the scheduling sequence.

With reference to the fourth aspect and/or the first and second possible implementation manners of the fourth aspect, in a third possible implementation manner, if the station is the $k^{th}$ in the scheduling sequence, the station sends the response message to the AP at a time T0+SIFS+(Tf+SIFS)(k−1), where T0 is a time when the station receives the second notification.

With reference to the fourth aspect and/or the first to third possible implementation manners of the fourth aspect, in a fourth possible implementation manner, if the station is the $k^{th}$ in the scheduling sequence and k=1, the station sends, by contending for a channel, the response message in response to the association message to the AP; and if the station is the $k^{th}$ in the scheduling sequence and k>1, the station sends the response message to the AP at a time Tm+SIFS+(Tf+SIFS) (k−m), where Tm is a time when an $m^{th}$ station in the scheduling sequence completes sending of the response message, where 1=<m<k.

According to the embodiments of the present invention, in a process of associating STAs with an AP, the AP may arrange a scheduling sequence for a selected group of STAs, so that the group of STAs may sequentially send response messages to the AP without having to contend for a channel, thereby reducing the number of channel contentions, accelerating the process of associating the STAs with the AP, and ensuring that a STA used for a key application can establish an association with the AP quickly.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In order to reduce the average association time for a large number of STAs to be associated with an AP, in a process of associating the STAs with the AP, after the AP assigns association identifiers (Association Identifiers, AIDs for short) to the STAs, subsequent association steps may be implemented by adopting solutions in the embodiments of the present invention.

Figure 1:
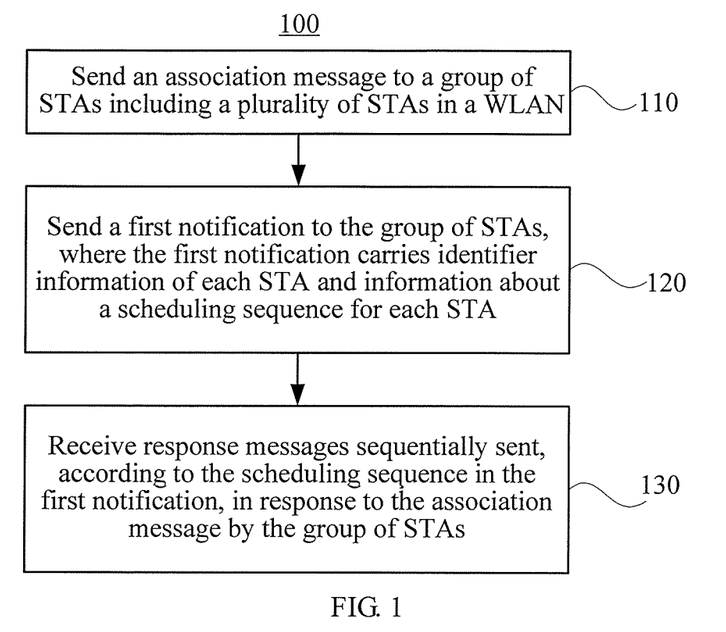
FIG. 1 is a schematic flow chart of a method according to an embodiment of the present invention.

FIG. 1 is a schematic flow chart of a method 100 for establishing an association in a WLAN according to an embodiment of the present invention. As shown in FIG. 1, the method 100 includes the following:

110. Send an association message to a group of STAs including a plurality of STAs in the WLAN.

In the embodiment of the present invention, the group of STAs described herein may by a type or group of STAs which have high requirements for a time delay, such as a health monitoring sensor and an alarm sensor. Although in the method shown in FIG. 1, it is illustrated that the association message is sent to the group of STAs, because the message is sent by an AP in a broadcast mode in the WLAN, all STAs in the whole WLAN receive the association message.

120. Send a first notification to the group of STAs, where the first notification carries identifier information of each STA and information about a scheduling sequence for each STA.

The AP sends the first notification to the group of STAs in a broadcast mode. The identifier information of the STAs in the first notification is, for example, an AID of each STA in the group of STAs, and the information about the scheduling sequence for each STA may be a sequence number corresponding to each AID, or a position in which the AID of each STA in the first notification is arranged in the notification. The first notification herein is used to arrange a sequence of sending the response messages for the STAs, so that the STAs do not need to contend for a channel but send the response messages according to the scheduling sequence.

According to the embodiment of the present invention, the first notification may further include a frame length Tf of the response message, which is preset by the AP for each STA.

130. Receive response messages sequentially sent, according to the scheduling sequence in the first notification, in response to the association message by the group of STAs.

In a possible implementation manner, the AP actively instructs the group of STAs to start to send corresponding messages according to the scheduling sequence. Considering that after receiving the association message, the group of STAs need a period of time for corresponding processing, a delay of a preset duration, for example, 100 ms, 200 ms, 500 ms or even 1 s, is required before the AP instructs the STAs to start to send the response messages. In this case, before step 130, the method 100 may further include:

sending, by the AP, a second notification to the group of STAs after a delay of a preset duration, where the second notification is used to instruct the group of STAs to start to send the response messages.

After receiving the second notification, the STAs in this group start to sequentially send the response messages according to the scheduling sequence. Furthermore, according to an optional solution, according to the scheduling sequence, adjacent STAs send the response messages at an interval of a short interframe space (Short Interframe Space, SIFS for short). After receiving the second notification, each STA accordingly calculates a time when the STA needs to send the response message. For example, if the number of STAs in the group of STAs is N, for the STA that is the $k^{th}$ (1<=k<=N) in the scheduling sequence, the time when the STA sends the response message is T0+SIFS+(Tf+SIFS)(k−1), where T0 is a time when the STA receives the second notification.

In another possible implementation manner, if each STA in the group of STAs can listen for uplink messages sent by other STAs to the AP, the AP may not need to send the second notification. In this case, after completing an operation corresponding to the association message, the STA that is the first (briefly referred to as STA1 hereinafter) as indicated by the information about the scheduling sequence carried in the first notification sends, by contending for a channel, the response message in response to the association message to the AP. A next STA as indicated by the information about the scheduling sequence listens for the response message sent by STA1 to the AP. For example, it is determined by parsing a frame header of the response message sent by STA1 to the AP that the message is a response message that STA1 sends to the AP, and therefore, the next STA sends, according to the information about the scheduling sequence carried in the first notification, the response message to the AP. Similarly, the interval at which adjacent STAs in the scheduling sequence send the response messages to the AP is a SIFS. It should be noted that the next STA does not have to listen for the response message sent by STA1 to the AP, and may listen for the response message sent by any STA that is previous to the STA. For example, STAk that is the $k^{th}$ in the scheduling sequence listens for the response message sent by STAm that is the $m^{th}$ (1=<m<k) in the scheduling sequence, and then calculates, according to m and k, a time when STAk needs to send the response message to the AP. To sum up, if the STA is the $k^{th}$ in the scheduling sequence and k>1, STAk sends the response message to the AP at a time Tm+SIFS+(Tf+SIFS) (k−m), where Tm is a time when STAm that is the $m^{th}$ in the scheduling sequence completes sending of the response message.

In another possible implementation manner, if a part of STAs in the group of STAs cannot listen for the response messages sent by other STAs to the AP, after completing an operation corresponding to the association message, STA1 sends, by contending for a channel, the response message in response to the association message to the AP. After receiving the response message sent by STA1, the AP sends, after a delay of a SIFS, a second notification to the group of STAs, where the second notification is used to instruct remaining STAs in the group of STAs to start to send the response messages. Subsequently, the AP sequentially receives the response messages sequentially sent, according to the scheduling sequence in the first notification, in response to the association message by the remaining STAs in the group of STAs.

The implementation process of the embodiments of the present invention has been described in detail from the perspective of an AP. The implementation process of the embodiments of the present invention is hereinafter further described in detail from the perspective of a STA.

Figure 2:
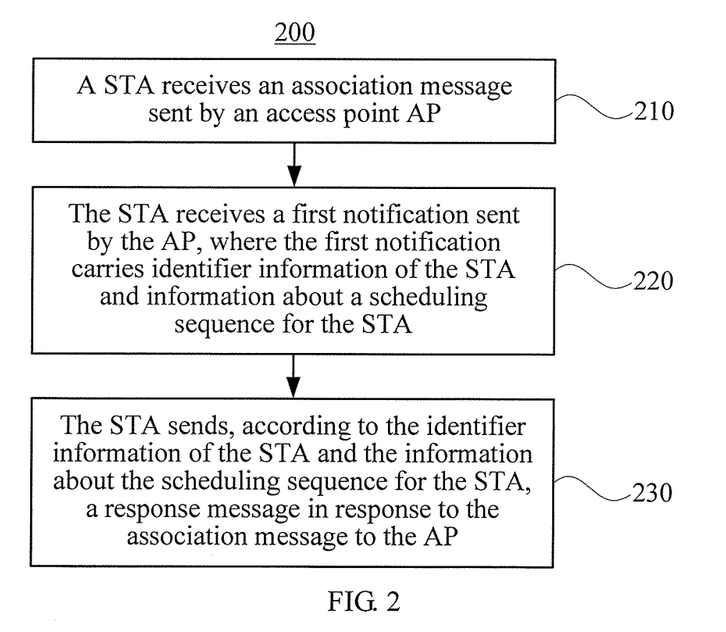
FIG. 2 is a schematic flow chart of a method according to an embodiment of the present invention.

FIG. 2 is a schematic flow chart of a method for establishing an association in a WLAN according to an embodiment of the present invention. As shown in FIG. 2, the method 200 includes the following:

210. A STA receives an association message sent by an access point AP.

220. The STA receives a first notification sent by the AP, where the first notification carries identifier information of the STA and information about a scheduling sequence for the STA.

230. The STA sends, according to the identifier information of the STA and the information about the scheduling sequence for the STA, a response message in response to the association message to the AP.

It should be noted that the STA is one in the group of STAs in the embodiment shown in FIG. 2.

According to the foregoing description, the first notification carries frame length information Tf of the response message, and adjacent STAs in the scheduling sequence send the response messages at an interval of a SIFS.

In a possible implementation manner, according to a notification of the AP, the STA starts to send the response message according to the scheduling sequence. In this case, the method 200 includes: receiving, by the STA, a second notification sent by the AP, where the second notification is used to instruct the STA to start to send the response message according to the scheduling sequence.

In this case, if the STA is the $k^{th}$ in the scheduling sequence, the STA sends the response message to the AP at a time T0+SIFS+(Tf+SIFS)(k−1), where T0 is a time when the STA receives the second notification.

In another possible implementation manner, the STA can listen for the response messages sent by other STAs to the AP. Therefore, the AP does not need to send the second notification. Instead, STA1 sends, by contending for a channel, the response message in response to the association message to the AP, and the subsequent STAs send the response messages to the AP in the foregoing manner. That is, if the STA is the $k^{th}$ in the scheduling sequence and k>1, the STA sends the response message to the AP at a time Tm+SIFS+(Tf+SIFS) (k−m), where Tm is a time when an $m^{th}$ STA in the scheduling sequence completes sending of the response message, where 1=<m<k.

According to the embodiments of the present invention, in a process of associating STAs with an AP, the AP arranges a scheduling sequence for a selected group of STAs, so that the group of STAs may sequentially send response messages to the AP without having to contend for a channel, thereby reducing the number of channel contentions, accelerating the process of associating the STAs with the AP, and ensuring that a STA used for a key application can establish an association with the AP quickly.

The embodiments of the present invention further provide an AP and a STA for implementing the methods in the embodiments of the present invention.

Figure 3:
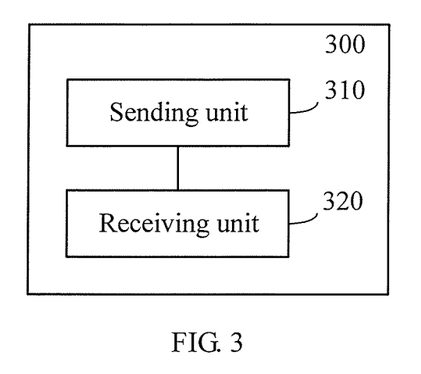
FIG. 3 is a schematic structural diagram of an access point according to an embodiment of the present invention.

FIG. 3 is a schematic structural diagram of an AP according to an embodiment of the present invention. As shown in FIG. 3, the AP 300 includes:

a sending unit 310, configured to send an association message to a group of stations STAs including a plurality of STAs in a wireless local area network WLAN, where the sending unit 310 is further configured to send a first notification to the group of STAs, where the first notification carries identifier information of each STA and information about a scheduling sequence for each STA; and a receiving unit 320, configured to receive response messages sequentially sent, according to the scheduling sequence in the first notification, in response to the association message by the group of STAs.

According to the embodiment of the present invention, the first notification carries frame length information Tf of the response messages, and adjacent STAs in the scheduling sequence send the response messages at an interval of a short interframe space SIFS.

According to the embodiment of the present invention, the sending unit 310 is further configured to send a second notification to the group of STAs after a delay of a preset duration, where the second notification is used to instruct the group of STAs to start to send the response messages; and if the STA is the $k^{th}$ in the scheduling sequence, the receiving unit 320 is configured to receive the response message that is sent by the STA at a time T0+SIFS+(Tf+SIFS) (k−1), where T0 is a time when the STA receives the second notification.

According to the embodiment of the present invention, the receiving unit 320 is configured to receive the response message sent, by contending for a channel, by the STA that is the first in the scheduling sequence; the sending unit 310 is configured to send a second notification to the group of STAs after the SIFS, where the second notification is used to instruct remaining STAs in the group of STAs to start to send the response messages; and the receiving unit 320 is configured to receive the response messages sequentially sent, according to the scheduling sequence in the first notification, in response to the association message by the remaining STAs in the group of STAs.

According to the embodiment of the present invention, if the STA is the $k^{th}$ in the scheduling sequence and k=1, the receiving unit 320 is configured to receive the response message sent, by contending for a channel, by the STA; and if the STA is the $k^{th}$ in the scheduling sequence and k>1, the receiving unit 320 is configured to receive the response message that is sent by the STA at a time Tm+SIFS+(Tf+SIFS) (k−m), where Tm is a time when an $m^{th}$ STA in the scheduling sequence completes sending of the response message, where 1=<m<k.

Figure 4:
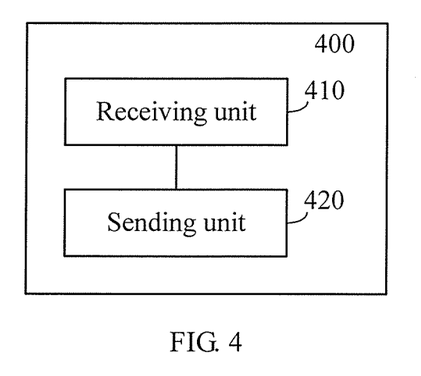
FIG. 4 is a schematic structural diagram of a station according to an embodiment of the present invention.

FIG. 4 is a schematic structural diagram of a STA according to an embodiment of the present invention. As shown in FIG. 4, the STA 400 includes:

a receiving unit 410, configured to receive an association message sent by an access point AP, where the receiving unit 410 is further configured to receive a first notification sent by the AP, where the first notification carries identifier information of the station STA and information about a scheduling sequence for the STA; and a sending unit 420, configured to send, according to the identifier information of the STA and the information about the scheduling sequence for the STA, a response message in response to the association message to the AP.

According to the embodiment of the present invention, the first notification carries frame length information Tf of the response message, and adjacent STAs in the scheduling sequence send the response messages at an interval of a short interframe space SIFS.

According to the embodiment of the present invention, the receiving unit 410 is further configured to receive a second notification sent by the AP, where the second notification is used to instruct the STA to start to send the response message according to the scheduling sequence.

According to the embodiment of the present invention, if the STA 400 is the $k^{th}$ in the scheduling sequence, the STA 400 sends the response message to the AP at a time T0+SIFS+(Tf+SIFS)(k−1), where T0 is a time when the STA 400 receives the second notification.

According to the embodiment of the present invention, if the STA 400 is the $k^{th}$ in the scheduling sequence and k=1, the STA 400 sends, by contending for a channel, the response message in response to the association message to the AP; and if the STA 400 is the $k^{th}$ in the scheduling sequence and k>1, the STA 400 sends the response message to the AP at a time Tm+SIFS+(Tf+SIFS)(k−m), where Tm is a time when an $m^{th}$ STA in the scheduling sequence completes sending of the response message, where 1=<m<k.

The embodiments of the present invention are hereinafter described by using examples in combination with an Extensible Authentication Protocol over LAN (Extensible Authentication Protocol over LAN, EAPOL for short) sub-process in the process of establishing associations between the STAs and the AP.

Figure 5:
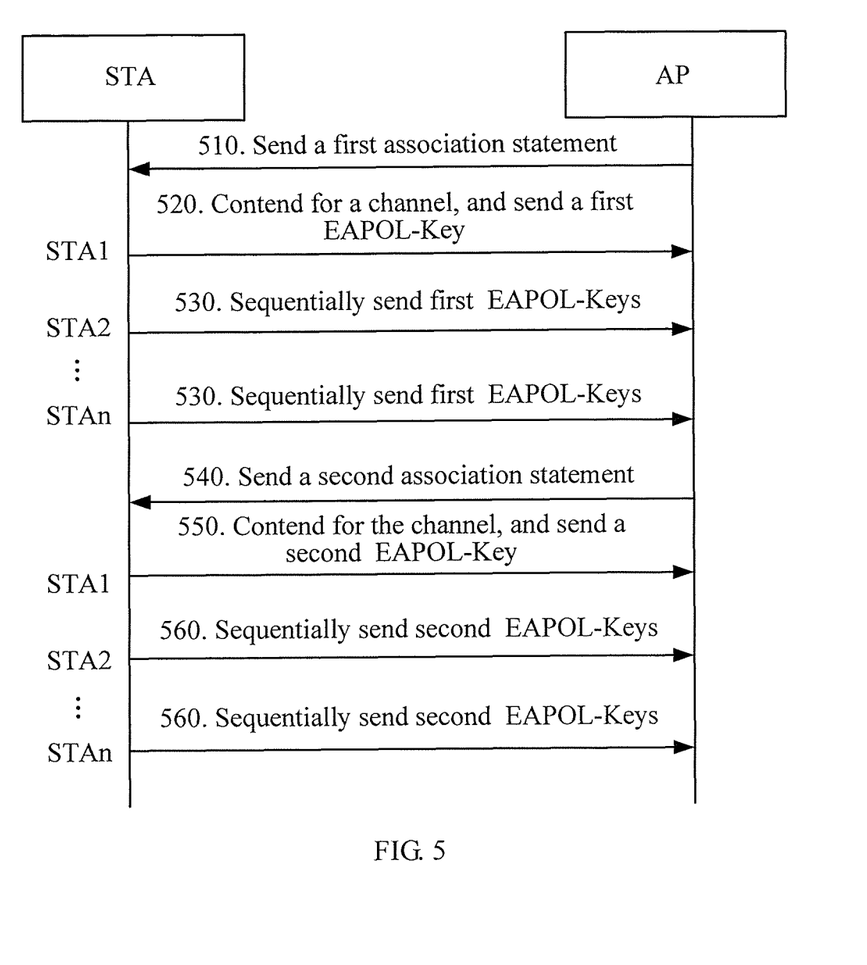
FIG. 5 is a diagram of signaling interaction of a specific application scenario according to an embodiment of the present invention.

FIG. 5 is a diagram of signaling interaction of a specific application scenario according to an embodiment of the present invention. As shown in FIG. 5, STAs and an AP use the solutions in the embodiments of the present invention to implement the EAPOL sub-process. In the embodiment, it is assumed that the STAs can listen for uplink messages sent by other STAs to the AP. A specific process of signaling interaction is as follows:

510. An AP contends for a channel, and sends a first association message to a group of STAs (n STAs), where the first association message includes an AID of each STA in the group of STAs and an uplink frame length Tf required by each STA, and STAT, STAn represent a scheduling sequence for the STAs in the first association message.

520. STA1 in the group of STAs contends for the channel, and sends a first EAPOL-Key (EAPOL-Key) to the AP.

530. Other STAs in the group of STAs, including STA2, STAn, listen for the first EAPOL-Key sent by STA1 to the AP, and sequentially send first EAPOL-Keys to the AP according to the scheduling sequence, and the adjacent two STAs in the scheduling sequence send the first EAPOL-Keys at an interval of a SIFS.

540. The AP contends for the channel, and sends a second association message to the group of STAs, where the second association message includes an AID of each STA in the group of STAs and an uplink frame length Tf required by each STA, and STA1, . . . , STAn represent a scheduling sequence for the STAs in the second association message.

550. STA1 in the group of STAs contends for the channel, and sends a second EAPOL-Key to the AP.

560. Other STAs in the group of STAs, including STA2, . . . , STAn, listen for the second EAPOL-Key sent by STA1 to the AP, and sequentially send second EAPOL-Keys to the AP according to the scheduling sequence, and the adjacent two STAs in the scheduling sequence send the second EAPOL-Keys at an interval of a SIFS.

Figure 6:
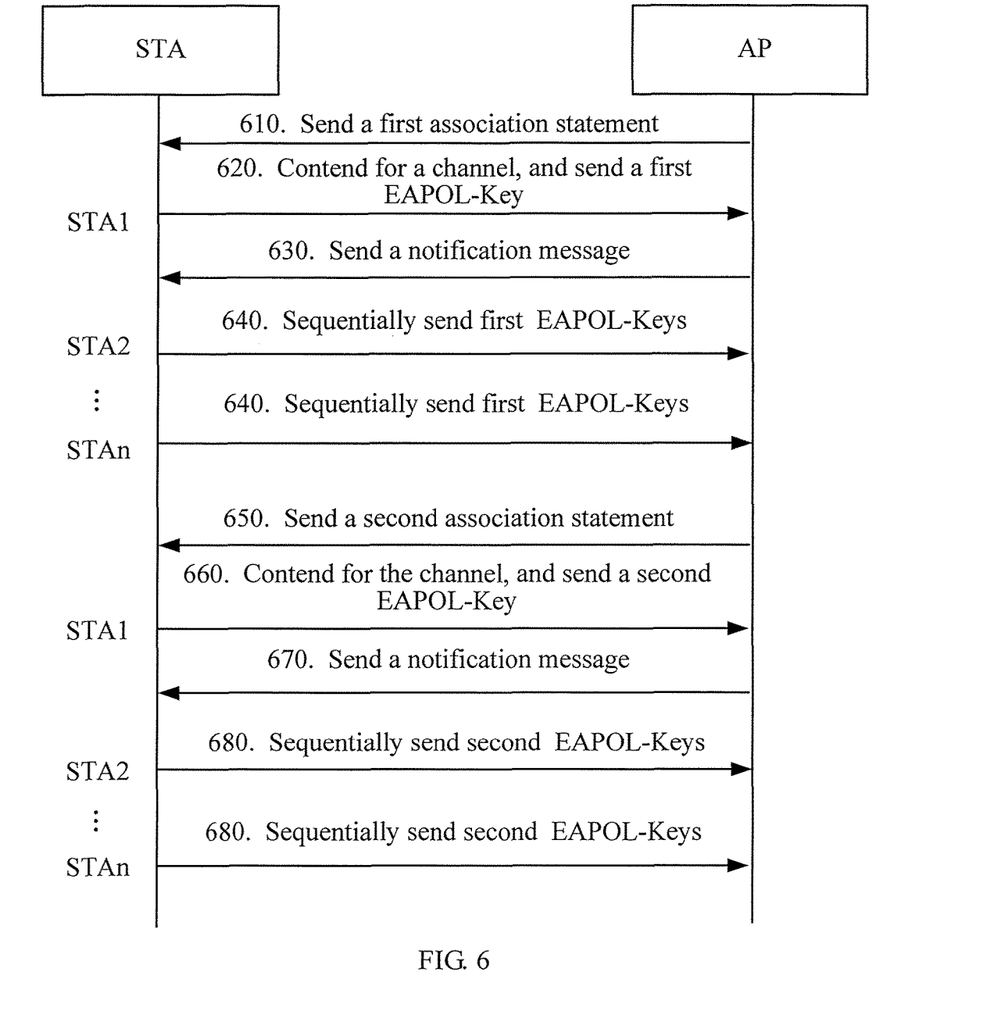
FIG. 6 is a diagram of signaling interaction of another specific application scenario according to an embodiment of the present invention.

FIG. 6 is a diagram of signaling interaction of another specific application scenario according to an embodiment of the present invention. In the example shown in FIG. 6, it is assumed that apart of STAs in the group of STAs cannot listen for uplink messages sent by other STAs to the AP. As shown in FIG. 6, a specific process of signaling interaction is as follows:

610. An AP contends for a channel, and sends a first association message to a group of STAs (n STAs), where the first association message includes an AID of each STA in the group of STAs and an uplink frame length Tf required by each STA, and STA1, . . . , STAn represent a scheduling sequence for the STAs in the first association message.

620. STA1 in the group of STAs contends for the channel, and sends a first EAPOL-Key to the AP.

630. After receiving the first EAPOL-Key sent by STA1, the AP sends a notification message to the group of STAs after a SIFS to instruct remaining STAs in the group of STAs to sequentially send, according to the scheduling sequence in the first association message, first EAPOL-Keys to the AP.

640. After receiving the notification message sent by the AP, other STAs in the group of STAs, including STA2, . . . , STAn, sequentially send, according to the scheduling sequence, first EAPOL-Keys to the AP, and the adjacent two STAs in the scheduling sequence send the first EAPOL-Keys at an interval of a SIFS, where the sending time of the STA that is the $k^{th}$ (1<k<=n) in the scheduling sequence is T0+SIFS+(Tf+SIFS)(k−1), and T0 is a time when the STA receives the notification message sent by the AP.

650. The AP contends for the channel, and sends a second association message to the group of STAs, where the second association message includes an AID of each STA in the group of STAs and an uplink frame length Tf required by each STA, and STA1, . . . , STAn represent a scheduling sequence for the STAs in the second association message.

660. STA1 in the group of STAs contends for the channel, and sends a second EAPOL-Key to the AP.

670. After receiving the second EAPOL-Key sent by STA1, the AP sends a notification message to the group of STAs after a SIFS to instruct remaining STAs in the group of STAs to sequentially send, according to the scheduling sequence in the second association message, second EAPOL-Keys to the AP.

680. After receiving the notification message sent by the AP, other STAs in the group of STAs, including STA2, . . . , STAn, sequentially send, according to the scheduling sequence, second EAPOL-Keys to the AP, and the adjacent two STAs in the scheduling sequence send the second EAPOL-Keys at an interval of a SIFS.

Figure 7:
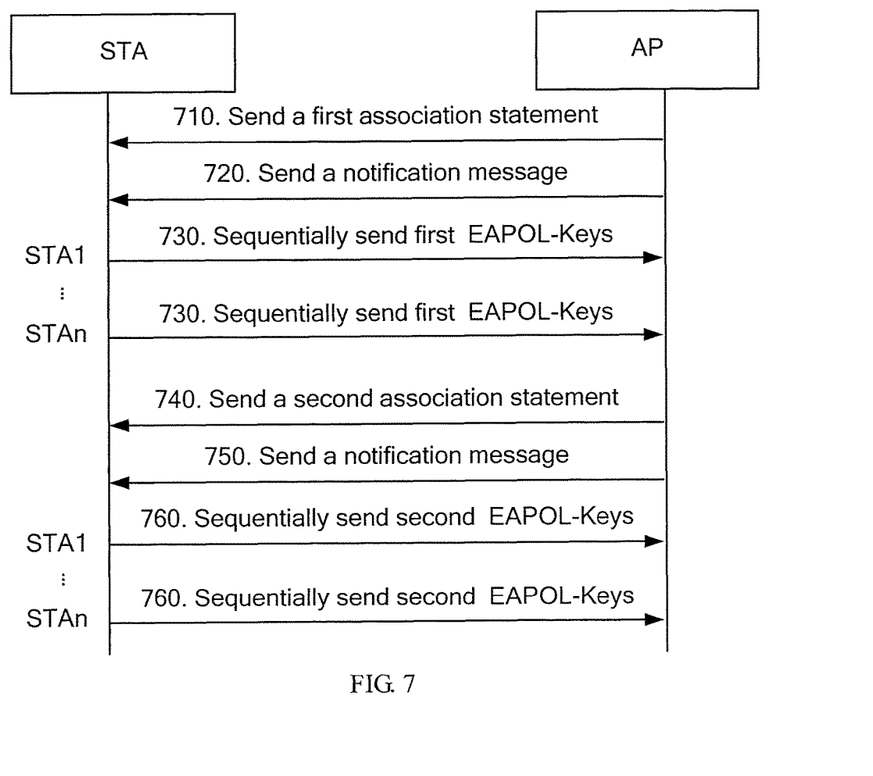
FIG. 7 is a diagram of signaling interaction of another specific application scenario according to an embodiment of the present invention.

FIG. 7 is a diagram of signaling interaction of another specific application scenario according to an embodiment of the present invention. In the example shown in FIG. 7, it is assumed that none of STAs in the group of STAs can listen for uplink messages sent by other STAs to the AP. As shown in FIG. 7, a specific process of signaling interaction is as follows:

710. An AP contends for a channel, and sends a first association message to a group of STAs (n STAs), where the first association message includes an AID of each STA in the group of STAs and an uplink frame length Tf required by each STA, and STA1, . . . , STAn represent a scheduling sequence for the STAs in the first association message.

720. After a delay of a preset duration, the AP sends a notification message to the group of STAs to instruct the STAs in the group of STAs to sequentially send, according to the scheduling sequence in the first association message, first EAPOL-Keys to the AP.

730. After receiving the notification message sent by the AP, the STAs in the group of STAs from STA1 to STAn sequentially send, according to the scheduling sequence, first EAPOL-Keys to the AP, and the adjacent two STAs in the scheduling sequence send the first EAPOL-Keys at an interval of a SIFS, where the sending time of the STA that is the $k^{th}$ (1<k<=n) in the scheduling sequence is T0+SIFS+ (Tf+SIFS)(k−1), and T0 is a time when the STA receives the notification message sent by the AP.

740. The AP contends for the channel, and sends a second association message to the group of STAs, where the second association message includes an AID of each STA in the group of STAs and an uplink frame length Tf required by each STA, and STA1, . . . , STAn represent a scheduling sequence for the STAs in the second association message.

750. After a delay of a preset duration, the AP sends a notification message to the group of STAs to instruct the STAs in the group of STAs to sequentially send, according to the scheduling sequence in the second association message, second EAPOL-Keys to the AP.

760. After receiving the notification message sent by the AP, STAs in the group of STAs from STA1 to STAn sequentially send, according to the scheduling sequence, second EAPOL-Keys to the AP, and the adjacent two STAs in the scheduling sequence send the second EAPOL-Keys at an interval of a SIFS.

Figure 8:
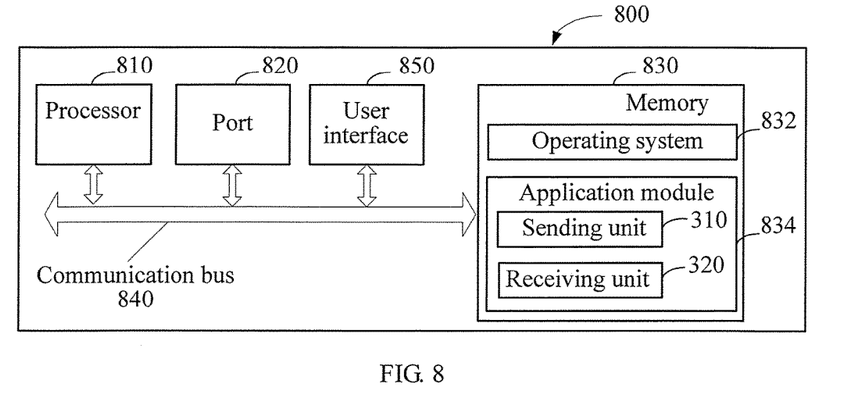
FIG. 8 is a schematic structural diagram of another access point according to an embodiment of the present invention.

FIG. 8 is a schematic structural diagram of an AP provided in an embodiment of the present invention. As shown in FIG. 8, the AP generally includes at least one processor 810 such as a CPU, at least one port 820, at least one memory 830, and at least one communication bus 840. The communication bus 840 is configured to implement connection and communication between these components. The processor 810 is configured to implement an executable module, for example, a computer program, stored in the memory 830. The AP optionally includes a user interface 850, which includes, but is not limited to, a display, a keyboard, and a pointing device such as a mouse, a trackball (trackball), a touchpad, or a touchscreen. The memory 830 may include a high-speed RAM memory, and may further include a non-volatile memory (non-volatile memory), for example, at least one disk memory. Communication and connection between the AP and at least one STA are implemented through at least one port 820, and communication and connection between the AP and at least one network node are implemented through at least another port 820.

In some embodiments, the memory 830 stores the following elements, executable modules or data structures, or a subset of thereof, or a superset thereof:

an operating system 832, including various system programs, configured to implement various basic services and process a task based on hardware; and an application module 834, including various application programs, configured to implement various application services.

The application module 834 includes, but is not limited to, a sending unit 310 and a receiving unit 320.

For the specific implementation of units in the application module 834, reference may be made to corresponding units shown in FIG. 3, which are not repeated herein.

Figure 9:
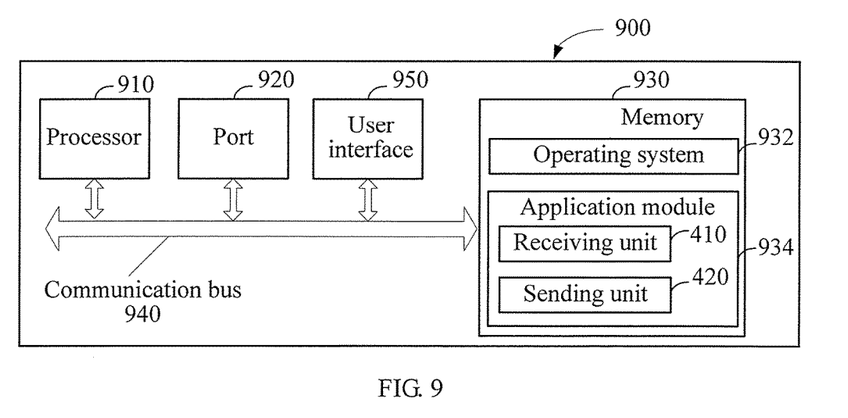
FIG. 9 is a schematic structural diagram of another station according to an embodiment of the present invention.

FIG. 9 is a schematic structural diagram of a STA provided in an embodiment of the present invention. As shown in FIG. 9, the STA generally includes at least one processor 910 such as a CPU, at least one port 920, at least one memory 930, and at least one communication bus 940. The communication bus 940 is configured to implement connection and communication between these components. The processor 910 is configured to implement an executable module, for example, a computer program, stored in the memory 930. The STA optionally includes a user interface 950, which includes, but is not limited to, a display, a keyboard, and a pointing device such as a mouse, a trackball (trackball), a touchpad, or a touchscreen. The memory 930 may include a high-speed RAM memory, and may further include a non-volatile memory (non-volatile memory), for example, at least one disk memory. Communication and connection between the STA and at least one AP are implemented through at least one port 920, and communication and connection between the STA and at least one STA node are implemented through at least another port 920.

In some embodiments, the memory 930 stores the following elements, executable modules or data structures, or a subset thereof, or a superset thereof:

an operating system 932, including various system programs, configured to implement various basic services and process a task based on hardware; and an application module 934, including various application programs, configured to implement various application services.

The application module 934 includes, but is not limited to, a receiving unit 410 and a sending unit 420.

For the specific implementation of units in the application module 934, reference may be made to corresponding units shown in FIG. 4, which are not repeated herein.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected to achieve the objectives of the solution of the embodiment according to actual needs.

In addition, functional units in the embodiments of the present invention may be integrated into one processing unit, or each of the units may exist alone physically, or two or more units may be integrated into one unit.

When the functions are implemented in a form of a software functional module and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for establishing an association in a wireless local area network (WLAN), the method comprising:
   sending an association message to a group of stations (STAs) comprising a plurality of STAs in the WLAN;
   sending a first notification to the group of STAs, wherein the first notification carries identifier information of each STA, information about a scheduling sequence for each STA, and frame length information (Tf) for response messages, wherein the scheduling sequence is based on the frame length information for each STA and a short interframe space, wherein each STA determines a schedule for responding based on the information about the scheduling sequence, the frame length information, and the short interframe space; and
   receiving response messages sequentially sent, according to the information about the scheduling sequence in the first notification, in response to the association message by the group of STAs.

2. The method according to claim 1, wherein:
   according to the scheduling sequence, adjacent STAs send the response messages at an interval of the short interframe space (SIFS).

3. The method according to claim 2, further comprising:
   sending a second notification to the group of STAs after a delay of a preset duration, wherein the second notification is used to instruct the group of STAs to start to send the response messages; and
   receiving response messages sequentially sent, according to the scheduling sequence in the first notification, in response to the association message by the group of STAs comprises:
   if the STA is the $k^{th}$ in the scheduling sequence, receiving the response message that is sent by the STA at a time T0+SIFS+(Tf+SIFS)(k−1), wherein T0 is a time when the STA receives the second notification.

4. The method according to claim 2, wherein receiving response messages sequentially sent, according to the information about the scheduling sequence in the first notification, in response to the association message by the group of STAs comprises:
   receiving the response message sent, by contending for a channel, by the STA that is the first in the scheduling sequence;
   sending a second notification to the group of STAs after the SIFS, wherein the second notification is used to instruct remaining STAs other than the STA that is the first in the scheduling sequence in the group of STAs to start to send the response messages; and
   receiving the response messages sequentially sent, according to the information about the scheduling sequence in the first notification, in response to the association message by the remaining STAs in the group of STAs.

5. The method according to claim 2, wherein receiving response messages sequentially sent, according to the information about the scheduling sequence in the first notification, in response to the association message by the group of STAs comprises:
  if the STA is the $k^{th}$ in the scheduling sequence and k=1, receiving the response message sent, by contending for a channel, by the STA; and
  if the STA is the $k^{th}$ in the scheduling sequence and k>1, receiving the response message that is sent by the STA at a time Tm+SIFS+(Tf+SIFS)(k−m), wherein Tm is a time when an $m^{th}$ STA in the scheduling sequence completes sending of the response message, wherein 1=<m<k.

6. A method for establishing an association in a wireless local area network, the method comprising:
  receiving an association message sent by an access point (AP);
  receiving a first notification sent by the AP, wherein the first notification carries identifier information of a station (STA), information about a scheduling sequence for the STA, and frame length information (Tf) for response messages, wherein the scheduling sequence is based on the frame length information for the STA and a short interframe space;
  determining a schedule for responding to the AP based on the information about the scheduling sequence for the STA, the frame length information, and the short interframe space; and
  sending, according to the determined schedule for responding to the AP, a response message in response to the association message to the AP.

7. The method according to claim 6, wherein:
  adjacent STAs in the scheduling sequence send the response messages at an interval of the short interframe space (SIFS).

8. The method according to claim 7, further comprising:
  receiving a second notification sent by the AP, wherein the second notification is used to instruct the STA to start to send the response message according to the scheduling sequence.

9. The method according to claim 8, wherein if the STA is the $k^{th}$ in the scheduling sequence, the STA sends the response message to the AP at a time T0+SIFS+(Tf+SIFS)(k−1), wherein T0 is a time when the STA receives the second notification.

10. The method according to claim 7, wherein sending, according to the determined schedule for responding to the AP, a response message in response to the association message to the AP specifically comprises:
  if the STA is the $k^{th}$ in the scheduling sequence and k=1, sending, by the STA, by contending for a channel, the response message in response to the association message to the AP; and
  if the STA is the $k^{th}$ in the scheduling sequence and k>1, sending, by the STA, the response message to the AP at a time Tm+SIFS+(Tf+SIFS)(k−m), wherein Tm is a time when an $m^{th}$ STA in the scheduling sequence completes sending of the response message, wherein 1=<m<k.

11. An access point, comprising:
  a sending unit, configured to send an association message to a group of stations (STAs) comprising a plurality of STAs in a wireless local network area (WLAN) and send a first notification to the group of STAs, wherein the first notification carries identifier information of each STA, information about a scheduling sequence for each STA, and frame length information (Tf) for response messages, wherein the scheduling sequence is based on the frame length information for each STA and a short interframe space, wherein each STA determines a schedule for responding based on the information about the scheduling sequence, the frame length information, and the short interframe space; and
  a receiving unit, configured to receive response messages sequentially sent, according to the information about the scheduling sequence in the first notification, in response to the association message by the group of STAs.

12. The access point according to claim 11, wherein according to the scheduling sequence, adjacent STAs send the response messages at an interval of the short interframe space (SIFS).

13. The access point according to claim 12, wherein the sending unit is further configured to:
  send a second notification to the group of STAs after a delay of a preset duration, wherein the second notification is used to instruct the group of STAs to start to send the response messages; and
  if the STA is the $k^{th}$ in the scheduling sequence, the receiving unit is configured to receive the response message that is sent by the STA at a time T0+SIFS+(Tf+SIFS)(k−1), wherein T0 is a time when the STA receives the second notification.

14. The access point according to claim 12, wherein:
  the receiving unit is configured to receive the response message sent, by contending for a channel, by the STA that is the first in the scheduling sequence;
  the sending unit is configured to send a second notification to the group of STAs after the SIFS, wherein the second notification is used to instruct remaining STAs in the group of STAs to start to send the response messages; and
  the receiving unit is configured to receive the response messages sequentially sent, according to the information about the scheduling sequence in the first notification, in response to the association message by the remaining STAs in the group of STAs.

15. The access point according to claim 12, wherein the receiving unit is configured to:
  if the STA is the $k^{th}$ in the scheduling sequence and k=1, receive the response message sent, by contending for a channel, by the STA; and
  if the STA is the $k^{th}$ in the scheduling sequence and k>1, receive the response message that is sent by the STA at a time Tm+SIFS+(Tf+SIFS)(k−m), wherein Tm is a time when an $m^{th}$ STA in the scheduling sequence completes sending of the response message, wherein 1=<m<k.

16. A station, comprising:
  a memory; and
  a processor in communication with the memory, wherein the processor is configured to:
  receive an association message sent by an access point (AP) and receive a first notification sent by the AP, wherein the first notification carries identifier information of the station, information about a scheduling sequence for the station, and frame length information (Tf) for response messages, wherein the scheduling sequence is based on the frame length information for the station and a short interframe space;
  determine a schedule for responding to the AP based on the information about the scheduling sequence for the station, the frame length information, and the short interframe space; and send, according to the determined schedule for responding to the AP, a response message in response to the association message to the AP.

17. The station according to claim 16, wherein adjacent stations in the scheduling sequence send the response messages at an interval of the short interframe space (SIFS).

18. The station according to claim 17, wherein the receiving unit is further configured to receive a second notification sent by the AP, wherein the second notification is used to instruct the station to start to send the response message according to the scheduling sequence.

19. The station according to claim 18, wherein:
if the station is the $k^{th}$ in the scheduling sequence, the station sends the response message to the AP at a time $T0+SIFS+(Tf+SIFS)(k-1)$, wherein T0 is a time when the station receives the second notification.

20. The station according to claim 17, wherein:
if the station is the $k^{th}$ in the scheduling sequence and $k=1$, the station sends, by contending for a channel, the response message in response to the association message to the AP; and
if the station is the $k^{th}$ in the scheduling sequence and $k>1$, the station sends the response message to the AP at a time $Tm+SIFS+(Tf+SIFS)(k-m)$, wherein Tm is a time when an $m^{th}$ station in the scheduling sequence completes sending of the response message, wherein $1=<m<k$.

* * * * *